(12) United States Patent
Neglur

(10) Patent No.: US 9,594,434 B1
(45) Date of Patent: Mar. 14, 2017

(54) AUTONOMOUS CAMERA SWITCHING

(71) Applicant: Amazon Technologies, Inc., Reno, NV (US)

(72) Inventor: Smita Neglur, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/317,716

(22) Filed: Jun. 27, 2014

(51) Int. Cl.
*G06F 3/01* (2006.01)

(52) U.S. Cl.
CPC .................................. *G06F 3/017* (2013.01)

(58) Field of Classification Search
None
See application file for complete search history.

(56) References Cited

U.S. PATENT DOCUMENTS

2005/0276009 A1* 12/2005 Kim ...................... G06F 1/1616
361/679.27
2010/0231285 A1* 9/2010 Boomer ............... H03K 17/005
327/403
2013/0258129 A1* 10/2013 Burns .................... H04N 5/232
348/222.1

* cited by examiner

*Primary Examiner* — Nicholas Lee
*Assistant Examiner* — Duane N Taylor, Jr.
(74) *Attorney, Agent, or Firm* — Polsinelli LLP

(57) ABSTRACT

A computing device having multiple sensors can operate in different modes, wherein each mode causes data captured by different sensors to be transmitted to a processing component for analysis. For example, a computing device includes one or more pairs of image sensors. Each pair can be configured such that the transmit lines of the sensors are selectively connected to a host processor. The transmission of data from the sensors can be coordinated by having a first sensor instruct a second sensor to transmit data to the host processor when the first sensor has completed transmitting its data to the host processor. In another example, a first sensor can transmit captured data to the host processor while the second sensor waits for a certain amount of time before transmitting its data. Once the certain amount of time has elapsed, the second sensor can begin transmitting its data to the host processor.

20 Claims, 12 Drawing Sheets

AUTONOMOUS CAMERA SWITCHING

BACKGROUND

People are increasingly interacting with computers and other electronic devices in new and interesting ways. One such interaction approach involves making a motion or gesture with respect to a device, which can be detected using a camera or other such element. While image recognition can be used with various cameras on a device to determine various types of motion, users often hold portable computing devices in ways that can block one or more of these cameras, or in orientations where one or more of these cameras are better suited to capture gesture information. While it can be desirable to utilize any camera on the device, the need to capture and analyze information from all these devices, as well as to provide redundant resources to support all these cameras, can take up space in the device and can consume additional resources. This can reduce battery life and increase the size of the device, among other potential disadvantages.

BRIEF DESCRIPTION OF THE DRAWINGS

Various embodiments in accordance with the present disclosure will be described with reference to the drawings, in which.

DETAILED DESCRIPTION

Figure 1:
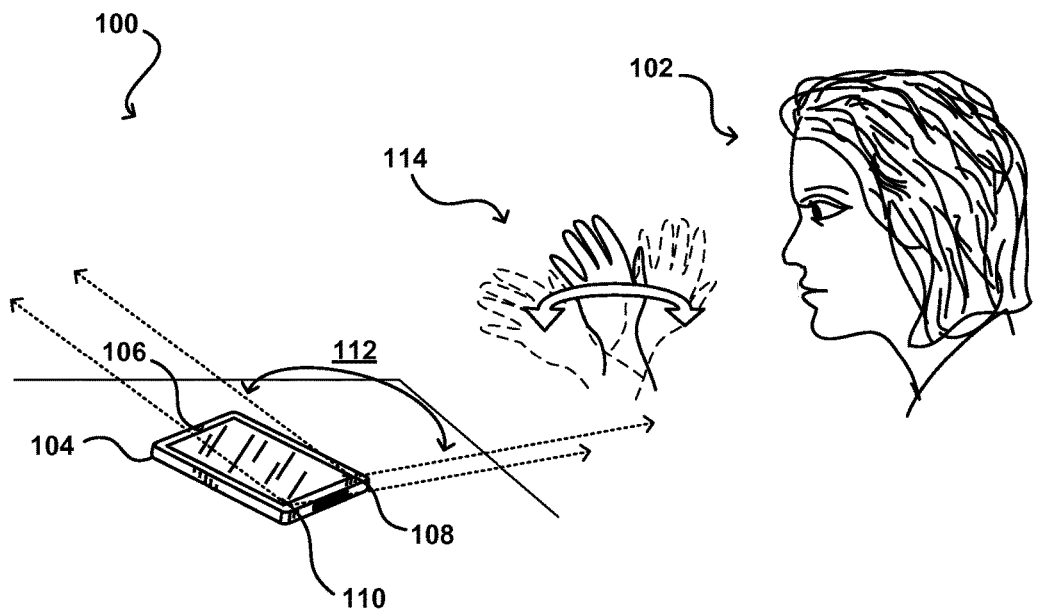
FIG. 1 illustrates an example environment in which various aspects can be implemented in accordance with various embodiments.

Systems and methods in accordance with various embodiments of the present disclosure overcome one or more of the aforementioned and other deficiencies experienced in conventional approaches to managing and utilizing sensors of a computing device. In particular, various approaches utilize multiple operational modes wherein certain sets or selections of the sensors are activated and able to have sensor data analyzed by one or more processors of the device. In one example, a computing device includes one or more pairs of image sensors, such as cameras or gesture sensors. The image sensors can be configured such that the transmit line of a second image sensor of a pair is connected to the transmit line of a first image sensor of the pair by a digital or electronic switch. Only a single transmit line of the pair is connected to a host processor or other such component. When in a normal operational mode, the switch can be configured to cause data captured by the first image sensor of the pair to be transmitted to a receive input of the host processor. When image data from the second image sensor is to be analyzed, the switch can be adjusted such that the device operates in what is referred to herein as a "bypass mode." In the bypass mode, the transmit line of the second image sensor is connected to the input of the host processor, such that only data from the second image sensor can be received and analyzed by the host processor in that state. By using such a configuration, the number of components, amount of space needed, and/or amount of complexity in the system can be reduced.

Further, the operation of the switch can be performed by one or more the sensors themselves without involvement by the host processor. As a result, any performance issues, e.g., latency issues and/or power usage, that may normally arise when the host processor is operating the switch can be eliminated. In some embodiments, one of the first image sensor and the second image sensor can be configured to delay the transmission of captured data for a specified amount of time. For example, when the first image sensor and the second image sensor both capture data, the switch can be adjusted to the normal operational mode, for example, by the first image sensor, and the first image sensor can transmit its captured data to the host processor as soon as the data is captured. Meanwhile, the second image sensor can be configured to store its captured data until the specified amount of time has elapsed. Once the specified amount of time has elapsed, the switch can be adjusted to the bypass operational mode, for example, by the first image sensor, and the second image sensor can transmit its captured data to the host processor. Again, once the specified amount of time has elapsed, the switch can be adjusted to the normal operational mode and the first image sensor can transmit its captured data to the host processor. This approach can be repeated each time the specified amount of time elapses.

In some embodiments, the first image sensor and the second image sensor are configured to notify one another once their transmission of data to the host processor is complete. For example, when the first image sensor and the second image sensor both capture data, the switch can be adjusted to the normal operational mode, for example, by the first image sensor, and the first image sensor can transmit its captured data to the host processor as soon as the data is captured. Meanwhile, the second image sensor can be configured to store its captured data until a notification is received from the first image sensor. Once the first image sensor completes its transmission of data to the host processor, the switch can be adjusted to the bypass operational mode, for example, by the first image sensor, and the first image sensor sends a notification to second image sensor instructing the second image sensor to begin transmitting its data to the host processor. Again, once the second image sensor completes its transmission of data to the host processor, the switch can be adjusted to the normal operational mode, for example and the second image sensor sends a notification to first image sensor instructing the first image sensor to begin transmitting its data to the host processor.

Various other applications, processes and uses are presented below with respect to the various embodiments.

FIG. 1 illustrates an example situation 100 wherein specific sensors of a device can be used to detect and provide information for analysis. In this example, a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one high resolution camera 106 operable to perform functions such as image and/or video capture for purposes such as self-portrait capture or video chat. The device also includes at least one pair of sensors 108, 110 operable to capture images for purposes such as gesture detection. The sensors 108, 110 may be, for example, cameras or gesture sensors. Further, the sensors 108, 110, and any other such image capture elements on the device may be, for example, a camera, a charge-coupled device (CCD), a motion detection sensor, an ultrasonic sensor, or an infrared sensor, or can utilize another appropriate image-capturing technology.

In this example, the user 102 is performing a selected motion or gesture using the user's hand 114. The motion can be one of a set of motions or gestures recognized by the device to correspond to a particular input or action. If the motion is performed within a viewable area or angular range 112 of the pair of sensors 108, 110 on the device, the sensors can capture one or more images including the motion, such that the device can analyze the images using at least one image analysis or feature recognition algorithm and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. If a motion or gesture is detected that matches a known motion or gesture, a determination can be made of a corresponding input to provide to software executing on the computing device. This can include, for example, sending an input to a user interface application executing on the device, whereby a user can provide input to the user interface application by performing one or more gestures within a field of view of one or more gesture cameras or other such elements.

Approaches in accordance with various embodiments can take advantage of various aspects of CMOS camera technology, or other such imaging technology, to provide a relatively low power but highly accurate gesture sensor that can utilize existing design and implementation aspects to provide a sensible solution to gesture detection. Such a gesture sensor can be used in addition to a conventional camera, in at least some embodiments, which can enable a user to activate or control aspects of the computing device through gesture or movement input, without utilizing a significant amount of resources on the device. A single gesture sensor can be used for basic gestures, or two or more sensors can be used for complex and/or three-dimensional gestures, among other such options.

Figure 2:
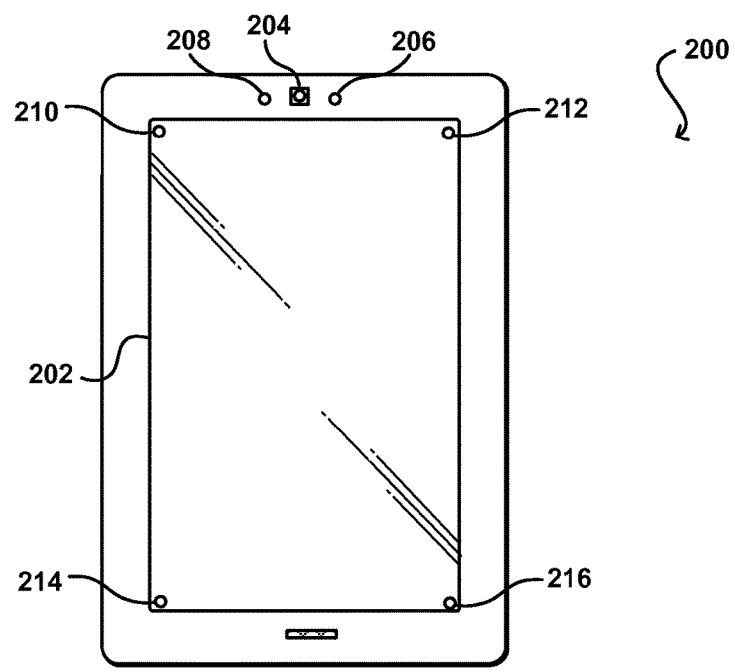
FIG. 2 illustrates an example computing device that can be used in accordance with various embodiments.

FIG. 2 illustrates an example computing device 200 that can be used in accordance with various embodiments. In this example, the device has a conventional digital camera 204 on the same side of the device as a display element 202, enabling the device to capture image information about a user of the device during typical operation where the user is at least partially in front of the display element. In addition, there are four sensors 210, 212, 214, 216 positioned on the same side of the device that can be used to determine gesture input from the user when at relatively the same location. It should be understood that there can be additional cameras, sensors, or other such elements on the same or other sides or locations of the device as well within the scope of the various embodiments, such as may enable gesture or image input from any desired direction or location with respect to the device. Two image sensors, such as two gesture sensors or a gesture sensor and a camera, among other sensors of different types, e.g., different color depth (number of bits used to indicate the color of a single pixel in a bitmapped image or video frame buffer), monochrome, infrared, higher resolution, etc., can be used together advantageously in various situations, such as where a device wants to enable gesture recognition at relatively low power over an extended period of time using the gesture sensor(s), and perform facial recognition or other processor and power intensive processes at specific times using the conventional, higher resolution camera.

This example device also illustrates additional elements that can be used as discussed later herein, including a light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. Various other elements and combinations of elements can be used as well within the scope of the various embodiments as should be apparent in light of the teachings and suggestions contained herein.

In many embodiments, image data captured by two of the sensors will be sufficient to determine a motion or gesture, performed by a user, in two or three dimensions. Thus, it can be advantageous to only operate a selected subset of the sensors in FIG. 2, in order to save power and reduce the processing and memory capacity needed to support all four sensors operating concurrently. Further, as discussed above, in certain orientations it can be more likely that certain sensors might be in better position to view a user, or it might be more likely that one or more of the sensors might be blocked by one or more hands of the user. If only a subset of the sensors will be active at any time, it then can be desirable to reduce the number of components associated with the sensors that would otherwise be needed to store, route, and/or analyze the additional data.

When performing tasks such as detecting gestures in three dimensions using two sensors, each sensor will need to be connected to a processing component such as a host processor or application processor. In certain conventional approaches, each sensor can have a receive line and a transmit line, or other transmission mechanism, that connects to the processing component. For image sensors, each sensor can have a MIPI transmitter and a MIPI receiver, among other such options. If there are multiple pairs of sensors on the device, and only one of each pair of sensors will be transferring data to the processing component at any given time, then at least some of this redundancy can be advantageously removed by providing only a single connection from each pair of sensors to the processing component.

Figure 3A:
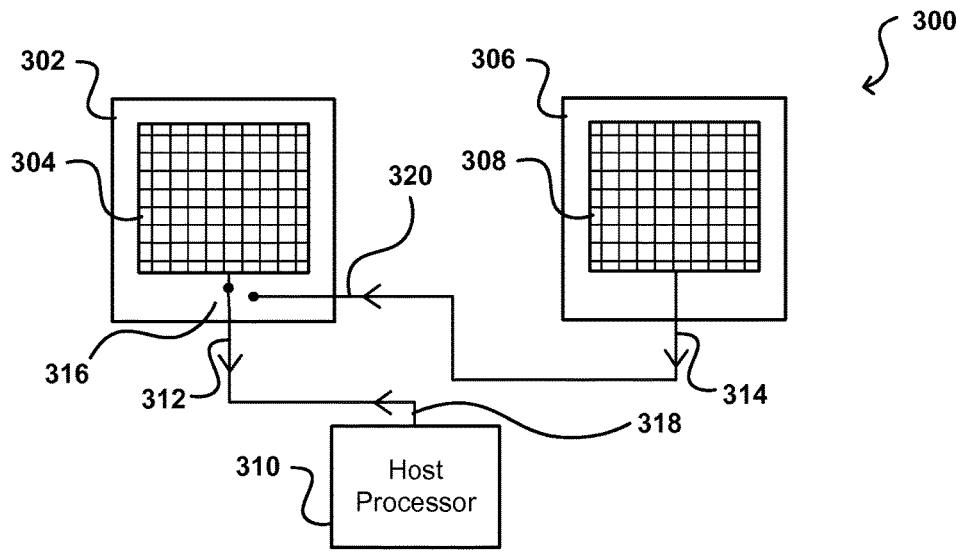
FIGS. 3(a), 3(b), and 3(c) illustrate normal and bypass operational configurations for a pair of sensors that can be used in accordance with various embodiments.

For example, consider the example configuration 300 of FIG. 3(a). In this example, a pair of image sensors 302, 306, or other such sensors, for example, as described herein, each contains an active region 304, 308, respectively, for capturing data, e.g., light, and the sensors can each provide a signal including data representative of the captured data. In conventional approaches, each of these sensors 302, 306 would have a MIPI transmitter directed to a MIPI receiver of the associated host processor 310. In this example, however, the MIPI transmit line 314 from one of the image sensors 306 is connected to the other sensor 302 using a MIPI receive line 320 or other input to the sensor 302. In at least some embodiments, a connection between sensors can be accomplished using a multiplexer (MUX). The MUX can be a dedicated Application-specific Integrated Circuit (ASIC) that combines the incoming data or a high speed analog MUX. In this embodiment, an electronic switch 316 is positioned at the location of the connection, and can alternatively connect the MIPI transmit of either of the sensors to the MIPI receive line 318 of the host processor 310. In some embodiments, the switch 316 is implemented using a general-purpose input/output (GPIO) pin. The switch 316 can be placed at, or near, the last stage in the MIPI pipeline. The configuration illustrated in FIG. 3(a) will be referred to herein as a "normal" mode, as the switch connects the MIPI transmit 312 of the first image sensor 302 to the host processor 310, whereby data captured by the first sensor can be streamed, or otherwise transmitted, to the host processor.

Figure 3B:
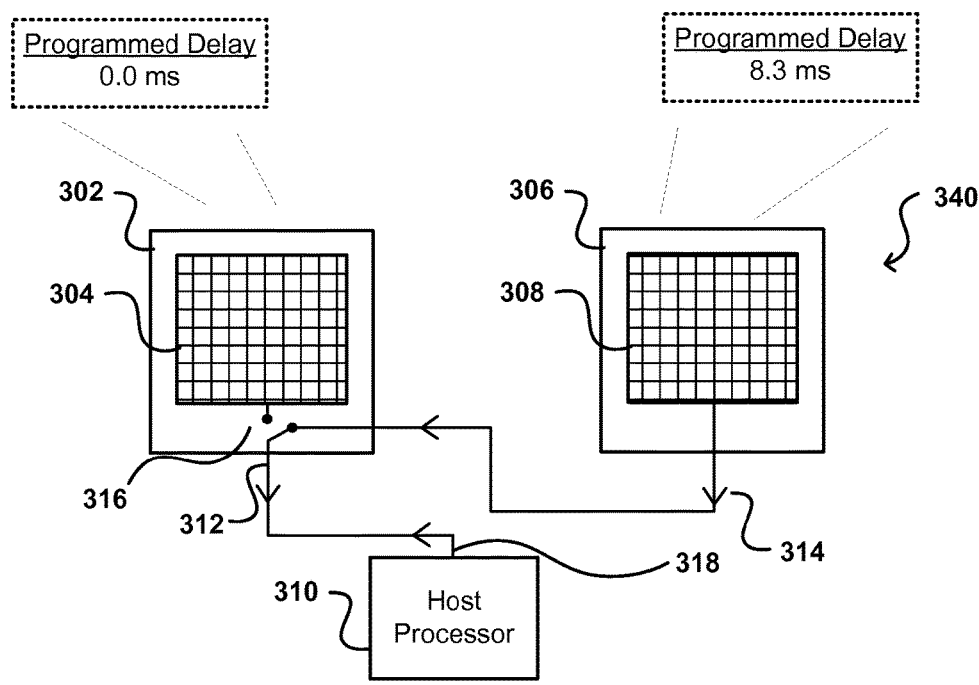

FIG. 3(b) illustrates the same components, but in this example the switch 316 is in a bypass setting for the configuration 340 and, as a result, the MIPI transmit line 314 of the second image sensor 306 is connected to the receive line 318 of the host processor. This mode is referred to herein as "bypass" mode. In bypass mode, only the data from the second sensor 306 can be streamed, or otherwise transmitted, to the host processor 310. By changing the "position" of the switch 312, the device can alternatively operate in normal or bypass mode, allowing data from one or the other of the sensors to be received to the host processor 310 over the MIPI receive line 318.

Such an approach can enable a daisy-chain or master-slave style control scheme. An application processor or other component can cause the switch to alternate between normal and bypass settings, and can contact each image sensor as appropriate to indicate the mode to be utilized. In some embodiments, each image sensor might instead determine the mode by the state of the switch. Other approaches can be utilized as well within the scope of the various embodiments. Since data from only one of the sensors will be passing into the MIPI receiver of the host processor, there can be no need for data muxing in at least some embodiments.

As mentioned, the electronic switch 316 can be toggled by application processor or other component when a sensor has completed transmitting its signal. For example, the host processor 310 can evaluate data being sent over the MIPI transmit line 312 of the sensor 302 to determine when the sensor 302 has completed transmission of its signal that is representative of a frame of data. A complete transmission of a frame of data may be determined, for example, when an "end of frame" packet is received through the MIPI receive line 318. Once the sensor 302 has completed transmitting its frame of data, an interrupt is generated to instruct the host processor 310 to toggle the position of the switch 316 to the bypass mode so that the sensor 306 can begin transmitting its frame of data over the MIPI transmit line 314. The sensor 306 may be contacted to indicate that the switch 316 is now in the bypass mode. Under this approach, toggling of the position of the switch 316 is performed manually, for example, by the host processor 310. Consequently, latency issues associated with toggling the position of the switch 316 may arise, especially when the host processor 310 is busy servicing other tasks and cannot immediately attend to toggling the position of the switch 316.

In some embodiments, the position of the switch 316 is able to be toggled autonomously by the sensor 302 without requiring intervention from the host, e.g., the host processor 310. In such embodiments, the sensor 302 is configured to automatically toggle the position of the switch 316 at a specified time interval. This time interval can be determined based at least in part on an amount of time for reading out a fixed amount of data from a sensor, for example, by the host processor 310. Depending on the implementation, this fixed amount of data can be determined in terms of a number of data packets, bits, or frames to be transmitted by a first sensor before the same fixed amount of data is able to be transmitted by a second sensor.

As mentioned, the sensors 302, 306 are each configured to transmit data that was captured by the sensors. The captured data can be transmitted by each of the sensors 302, 306 as frames of data over their respective transmit lines, as described above. The amount of time needed to capture one frame of data can be determined based on the number of frames per second that the sensor is configured to capture. Thus, if the sensors 302, 306 are configured to capture 60 frames per second, then each sensor will need approximately 16.6 milliseconds to capture one frame of data. This amount of time can be used to determine when to toggle the position of the switch 316.

In this example, each sensor 302, 306 will capture a respective frame of data every 16.6 milliseconds. Therefore, if the sensor 302 is configured to first transmit its data to the host processor 310, then the switch 316 can initially be positioned in the normal mode so that only data from the sensor 302 can be transmitted to the host processor 310. Once the specified amount of time for reading the captured data from the sensor 302 has elapsed, e.g., 8.3 milliseconds, then the position of the switch 316 is automatically switched to the bypass mode so that only data from the sensor 306 can be transmitted to the host processor 310. Again, once the specified amount of time for reading the captured data from the sensor 306 has elapsed, e.g., 8.3 milliseconds, then the position of the switch 316 is automatically switched to the normal mode so that only data from the sensor 302 can be transmitted to the host processor 310. Thus, the position of the switch 316 continues to be toggled between the normal mode and the bypass mode each time the specified amount of time elapses.

Depending on the implementation, the host processor 310 can be configured to read-out the captured data from each sensor 302, 306 at a faster rate, e.g., every 4 milliseconds, rather than 8.3 milliseconds. In such implementations, the switch 316 can be configured to automatically switch between modes at the faster rate, e.g., every 4 milliseconds. Further, various approaches can be utilized for tracking the amount of time that has passed between toggling of the switch 316, including, for example, a counter or clock integrated circuit positioned in the sensor 302 or the switch 316.

As mentioned, each sensor 302, 306 will typically begin transmitting data as soon as it captures the data. To coordinate the transmission of data by the sensors 302, 306, in some embodiments, sensors are configured to delay the transmission of captured data until a specified amount of time for reading the captured data from a sensor has elapsed, e.g., 8.3 milliseconds. Thus, a sensor can be configured to store its captured data for a specified amount of time to give the other sensor enough time to transmit its capture data to the host processor 310.

For example, if the sensors 302, 306 capture 60 frames per second, then the amount of time needed for a sensor to capture one frame is approximately 16.6 milliseconds. Since both sensors 302, 306 will typically begin transmitting data as soon as the data is captured, to coordinate the transmission of data, one of the sensors 302, 306 can be instructed to delay its transmission by a specified amount of time, e.g., the amount of time needed to read the data captured by a sensor. In this example, the amount of time needed to read the data is 8.3 milliseconds. Therefore, the amount of delay time assigned to sensors determines the order in which the sensors will transmit data. In this example, to configure the sensor 302 to transmit first, the sensor 306 can be instructed to delay its transmission by 8.3 milliseconds. When the sensors 302, 306 each capture a frame, the switch 316 can be positioned in the normal mode and the sensor 302 can transmit its data to the host processor 310. When 8.3 milliseconds have elapsed, the position of the switch 316 can automatically be toggled to the bypass mode and the sensor 306 can begin transmitting its data to the host processor 310.

The respective clocks, or any other timekeeping approach being utilized, measuring the elapsed time for the switch 316 and the sensor 306 can be synchronized to further coordinate the interaction between the sensors 302, 306 and the switch 316. In a different example, to configure the sensor 306 to transmit first, the sensor 302 can be instructed to delay its transmission by 8.3 milliseconds. In this example, the switch 316 can start off as being positioned in the bypass mode so that the sensor 306 can transmit data as soon as the data is captured. Once 8.3 milliseconds have elapsed, the position of the switch 316 can automatically be toggled to the normal mode.

In some instances, not all sensors need to be active in capture mode. For example, if only one sensor 306 is needed for capturing image data, then the other sensor 302 can be configured to operate in a different operational mode including, for example, standby mode. In some embodiments, capture mode for the other sensor 302 can be disabled and the other sensor 302 is configured to operate in bypass mode (e.g., operate as a pass-through multiplexer) so that data captured by the sensor 306 can be transmitted to the host processor 318.

The bypass mode on a first sensor can be viewed as an extension of the differential MIPI lines for the second sensor. This architecture can be extended to connect multiple cameras or sensors, as any number of sensors can be alternately connected via such a switch in various embodiments. At any point in time only a single connected sensor of such a set will be transmitting data to the connected processor, regardless of the number of connected sensors. In some embodiments two or more sensors might be concurrently capturing data. Sensors not transferring data can store the data, e.g., in a frame buffer, until the sensor currently connected to the processor by the switch is done transmitting, or the switch is otherwise adjusted to connect a different sensor. In at least some embodiments one or more sensors not transferring data can be performing any of a number of different tasks, which might be related or unrelated to image capture. Thus, any sensor not currently connected by the switch can be programmed to perform any appropriate task or be in any desired mode. Such an approach can be beneficial for applications such as global shutter cameras, which have provision to store image data in the active area by design and will not need any extra storage. Such an implementation, however, is not limited to global shutter sensors and can be extended to rolling shutter imagers and other such sensor implementations. In some embodiments, data might be able to be muxed on the sensor associated with the switch in order to eliminate a MIPI receiver. If that sensor has sufficient memory, the data from the second sensor can be saved as the first sensor captures data, and while data is being captured for the first sensor data from the second sensor can be muxed and/or transmitted.

In some embodiments, a sensor not currently connected can begin streaming data before or after switching modes, and the other sensor can stop streaming data before or after switching modes. In at least some embodiments there can be separate inputs (e.g., $I^2C$ lines) for controlling data streaming and other such aspects for each sensor.

In some embodiments, the sensors may be low resolution sensors. An advantage to using low resolution sensors is that the amount of image data that must be transferred is significantly less than for conventional cameras. Accordingly, a lower bandwidth bus can be used for the sensors in at least some embodiments than is used for conventional cameras. For example, a conventional camera typically uses a bus such as a CIS (CMOS Image Sensor) or MIPI (Mobile Industry Processor Interface) bus to transfer pixel data from the camera to the host computer, application processor, central processing unit, etc. A low power, low resolution sensor, on the other hand, can have a number of pixels on the order of about 1024 pixels, or in the range of about 256 to 76,000 pixels. Further, the sensor can have frame rates for gesture interpretation on the order of about 60 frames per second, with ranges from about 15 frames per second to about 240 frames per second in various embodiments.

In some embodiments the sensors can be synchronized in order to enable tracking of objects between fields of view of the sensors. In one embodiment, synchronization commands can be sent over the $I^2C$ bus, or a dedicated line can be used to join the two sensors, in order to ensure synchronization. In a situation such as that illustrated in FIG. 2 where there are four sensors, and only two of them will be operating at any time, the four sensors can be logically split into two pairs, wherein each pair can operate in normal or bypass mode such that only one sensor of each pair would stream data at any time. In at least some embodiments, one pair can operate in normal mode while the other pair operates in bypass mode, in order to provide additional imaging options.

Figure 3C:
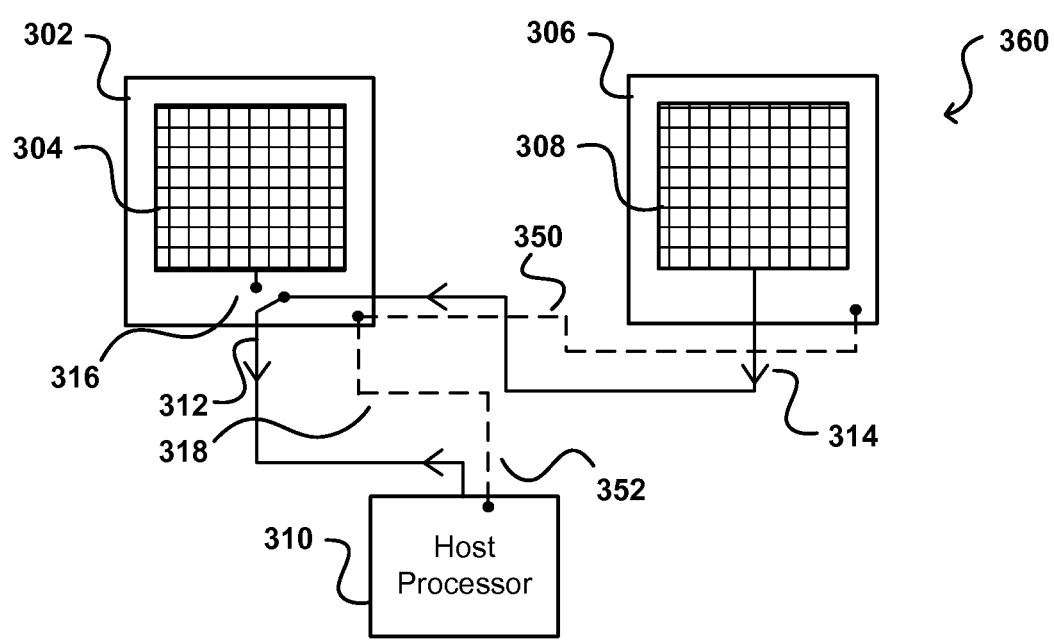

FIG. 3(c) illustrates the same components as FIG. 3(b), but in this example configuration 360 implements a different approach for coordinating the transmission of data by the sensors 302, 306. In some embodiments, the sensors 302, 306 are able to coordinate the transmission of data by indicating to one another when a sensor has completed transmission of its data. For example, in a configuration in which the sensor 302 is transmitting its data to the host processor 310 first, the switch 316 can be positioned in normal mode and the sensor 302 can transmit its data. Once the sensor 302 has completed transmitting its data, the sensor 302 can instruct the sensor 306 to begin transmitting its data. Upon receiving the instruction from the sensor 302, the switch 316 can be positioned in bypass mode and the sensor 306 can begin transmitting its data to the host processor 310. In some embodiments, the sensor 302 instructs the sensor 306 through an external general-purpose input/output (GPIO) pin 350 that connects the sensors 302, 306. In some embodiments, the host processor 310 is able to coordinate the transmission of data from the sensors 302, 306 using the GPIO pin 352.

Figure 4:
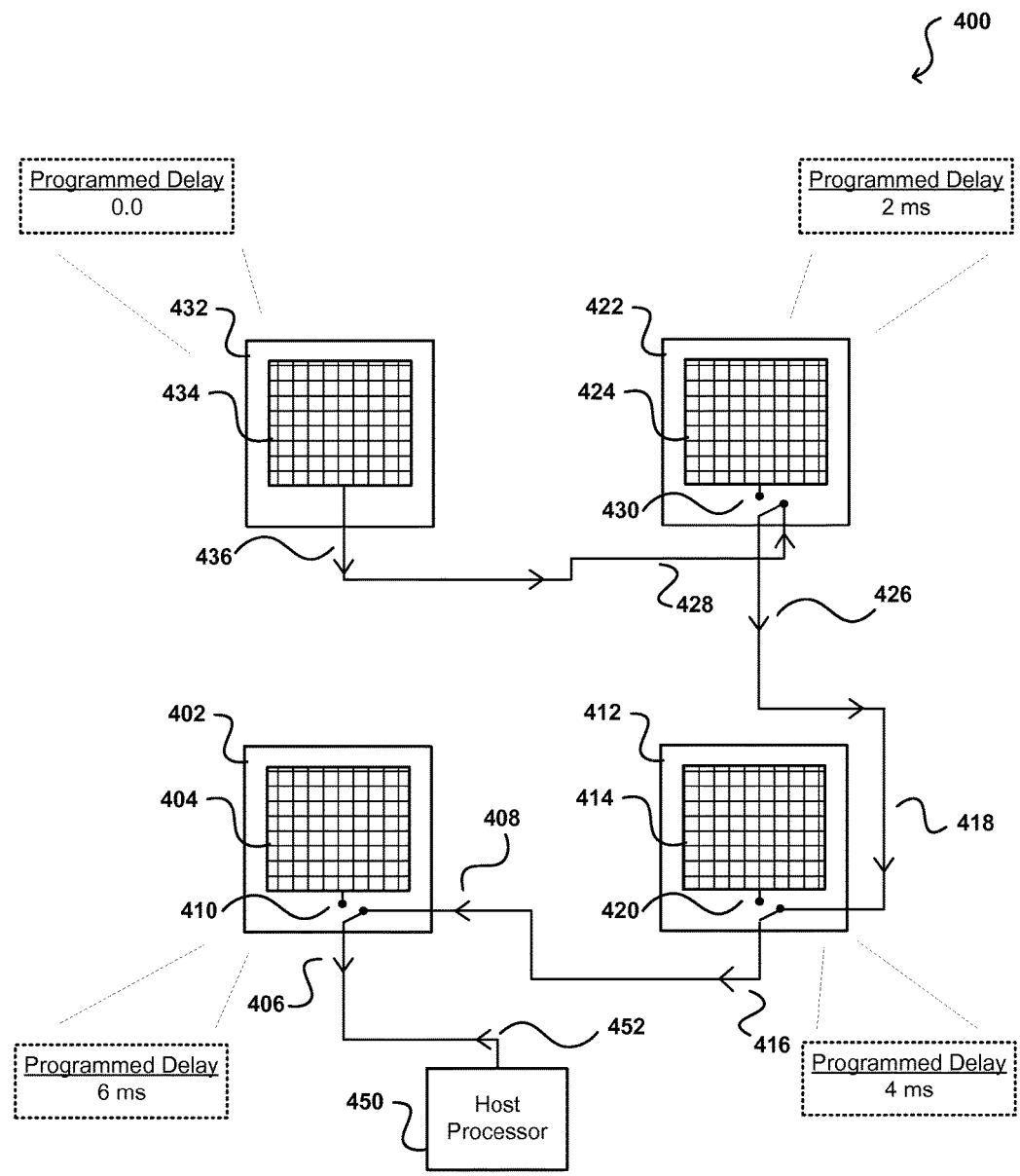
FIG. 4 illustrates a daisy-chain configuration for multiple sensors that can be used in accordance with various embodiments.

FIG. 4 illustrates a daisy-chain configuration 400 for multiple sensors 402, 412, 422, 432 that can be used in accordance with various embodiments. Each sensor 402, 412, 422, 432 contains an active region 404, 414, 424, 434, respectively, for capturing data, e.g., light, and the sensors can each provide a signal including data representative of the captured data.

In this example configuration, the MIPI transmit line 436 from the sensor 432 is connected to the sensor 422 using a MIPI receive line 428 or other input to the sensor 422. The connection between the sensors 422, 432 can be accomplished using a multiplexer (MUX) positioned in the sensor 422. An electronic switch 430 is positioned at the location of the connection, and can alternatively connect the MIPI transmit 426, 436 of either of the sensors 422, 432, respectively, to the MIPI receive line 418 of the sensor 412.

Additionally, the MIPI transmit line 426 from the sensor 422 is connected to the sensor 412 using a MIPI receive line 418 or other input to the sensor 412. The connection between the sensors 412, 422 can be accomplished using a multiplexer (MUX) positioned in the sensor 412. An electronic switch 420 is positioned at the location of the connection, and can alternatively connect the MIPI transmit 416, 426 of either of the sensors 412, 422, respectively, to the MIPI receive line 408 of the sensor 402.

Further, the MIPI transmit line 416 from the sensor 412 is connected to the sensor 402 using a MIPI receive line 408 or other input to the sensor 402. The connection between the sensors 402, 412 can be accomplished using a multiplexer (MUX) positioned in the sensor 402. An electronic switch 410 is positioned at the location of the connection, and can alternatively connect the MIPI transmit 406, 416 of either of the sensors 402, 412, respectively, to the MIPI receive line 452 of the host processor 450. As mentioned, the switches can be implemented using general-purpose input/output (GPIO) pins and can be placed at, or near, the last stage in the MIPI pipeline. In some daisy-chain embodiments, the sensors 402, 412, 422, and 432 are each configured to have a MIPI transmit line (or block) but no MIPI receive line (or block).

The electronic switches 410, 420, 430 can be toggled between normal mode and bypass mode, as described above, to allow each of the sensors 402, 412, 422, 432 to transmit data in turn. To coordinate the transmission of data by the sensors 402, 412, 422, 432, in some embodiments, sensors are configured to delay the transmission of captured data until a specified amount of time has elapsed. Thus, a sensor can be configured to store its captured data for a specified amount of time to give the other sensor enough time to transmit its capture data to the host processor.

The amount of delay specified for a sensor can therefore be used to configure an order of transmission by the sensors 402, 412, 422, 432, as described above. In this example configuration, the sensor 432 is configured to transmit its captured data, e.g., frame, first, followed by the sensor 422, then the sensor 412, and finally the sensor 402. In FIG. 4, the sensors 402, 412, 422, 432 each capture 120 frames per second and therefore capture one frame at approximately every 8.3 milliseconds. Thus, to configure this transmission order and to ensure that each frame captured by the sensors 402, 412, 422, 432 is able to be transmitted to the host processor 450, a transmission delay of 6 milliseconds is specified for the sensor 402, a transmission delay of 4 milliseconds is specified for the sensor 412, a transmission delay of 2 milliseconds is specified for the sensor 422, and no transmission delay is specified for the sensor 432. In other words, when the sensors 402, 412, 422, 432 capture data, for example, at or approximately at the same time, the sensor 432 is configured to transmit its captured data without delay, the sensor 422 is configured to transmit its captured data after 2 milliseconds have elapsed, the sensor 412 is configured to transmit its captured data after 4 milliseconds have elapsed, and the sensor 402 is configured to transmit its captured data 6 milliseconds have elapsed. Since it will take the host processor 450 approximately 8 milliseconds to receive the captured data from all of the sensors 402, 412, 422, 432, this delay configure allows the host processor 450 to receive the data captured by all of the sensors 402, 412, 422, 432 before the sensor 432 captures and transmits its next frame.

The electronic switches 410, 420, 430 will all initially be set to bypass mode, as illustrated in FIG. 4. When the sensors 402, 412, 422, and 432 each capture a frame, the sensor 432 is able to first transmit its captured data to the host processor 450 since all of the electronic switches 410, 420, 430 are in bypass mode. In this example, the transmission or read-out between the sensor 432 and the host processor 450 is configured to complete within approximately 2 milliseconds. At approximately 2 milliseconds, the transmission between the sensor 432 and the host processor 450 is assumed to be complete and the switch 430 is set to normal mode to allow the sensor 422, which was configured to begin its transmission after 2 milliseconds had elapsed, to begin its transmission of captured data to the host processor 450. After approximately another 2 milliseconds, or approximately 4 milliseconds in total, the transmission between the sensor 422 and the host processor 450 is assumed to be complete and the switch 420 is set to normal mode to allow the sensor 412, which was configured to begin its transmission after 4 milliseconds had elapsed, to begin its transmission of captured data to the host processor 450. After approximately another 2 milliseconds, or approximately 6 milliseconds in total, the transmission between the sensor 412 and the host processor 450 is assumed to be complete and the switch 410 is set to normal mode to allow the sensor 402, which was configured to begin its transmission after 6 milliseconds had elapsed, to begin its transmission of captured data to the host processor 450. After approximately another 2 milliseconds, the sensor 402 completes its transmission and the switches 410, 420, 430 will all again be set to bypass mode to receive the next captured frame from the sensor 432 and continue receiving captured data from the other sensors 422, 412, 402, as described above.

This order of transmission is provided merely as an example and, naturally, this ordering can easily be changed by adjusting the transmission delays assigned to the sensors and the operational modes of the switches 410, 420, 430. For example, a configuration in which the sensor 402 transmits first, the sensor 412 transmits second, the sensor 422 transmits third, and the sensor 432 transmits fourth can be implemented by setting the switches 410, 420, 430 to initially be set in the normal mode and by assigning a transmission delay of 6 milliseconds to the sensor 432, a transmission delay of 4 milliseconds to the sensor 422, a transmission delay of 2 milliseconds to the sensor 412, and no transmission delay to the sensor 402.

Figure 5A:
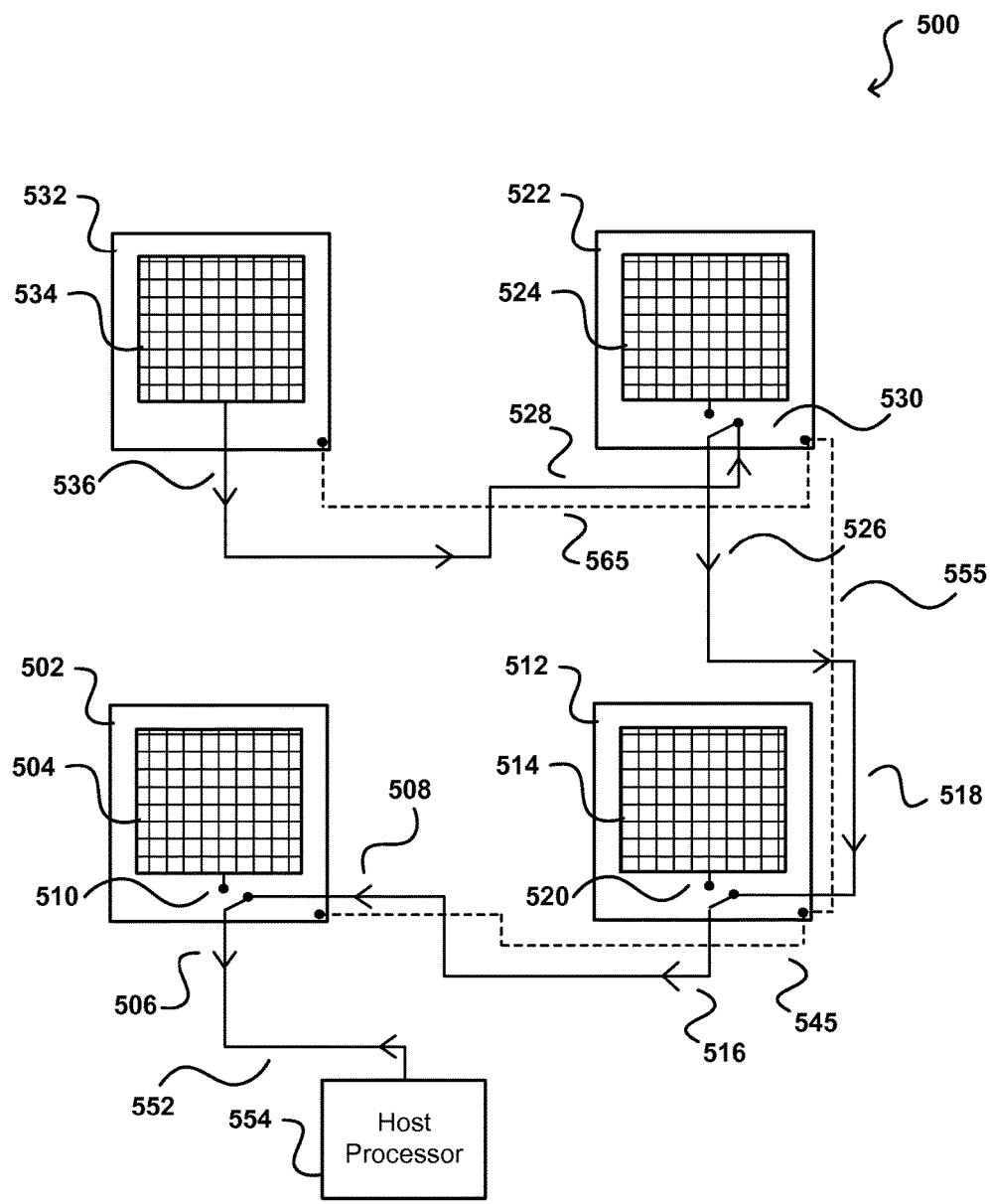
FIGS. 5(a) and 5(b) illustrate another daisy-chain configuration for multiple sensors that can be used in accordance with various embodiments.

FIG. 5(a) illustrates a daisy-chain configuration 500 for multiple sensors 502, 512, 522, 532 that can be used in accordance with various embodiments. Each sensor 502, 512, 522, 532 contains an active region 504, 514, 524, 534, respectively, for capturing data, e.g., light, and the sensors can each provide a signal including data representative of the captured data.

In this example configuration, the MIPI transmit line 536 from the sensor 532 is connected to the sensor 522 using a MIPI receive line 528 or other input to the sensor 522. The connection between the sensors 522, 532 can be accomplished using a multiplexer (MUX) positioned in the sensor 522. An electronic switch 530 is positioned at the location of the connection, and can alternatively connect the MIPI transmit 526, 536 of either of the sensors 522, 532, respectively, to the MIPI receive line 518 of the sensor 512.

Additionally, the MIPI transmit line 526 from the sensor 522 is connected to the sensor 512 using a MIPI receive line 518 or other input to the sensor 512. The connection between the sensors 512, 522 can be accomplished using a multiplexer (MUX) positioned in the sensor 512. An electronic switch 520 is positioned at the location of the connection, and can alternatively connect the MIPI transmit 516, 526 of either of the sensors 512, 522, respectively, to the MIPI receive line 508 of the sensor 502.

Further, the MIPI transmit line 516 from the sensor 512 is connected to the sensor 502 using a MIPI receive line 508 or other input to the sensor 502. The connection between the sensors 502, 512 can be accomplished using a multiplexer (MUX) positioned in the sensor 502. An electronic switch 510 is positioned at the location of the connection, and can alternatively connect the MIPI transmit 506, 516 of either of the sensors 502, 512, respectively, to the MIPI receive line 552 of the host processor 554. As mentioned, the switches can be implemented using general-purpose input/output (GPIO) pins and can be placed at, or near, the last stage in the MIPI pipeline.

The electronic switches 510, 520, 530 can be toggled between normal mode and bypass mode, as described above, to allow each of the sensors 502, 512, 522, 532 to transmit data in turn. To coordinate the transmission of data by the sensors 502, 512, 522, 532, in some embodiments, the sensors 502, 512, 522, 532 are able to coordinate the transmission of data by indicating to one another when a sensor has completed transmission of its data. In some embodiments, the sensors can coordinate the transmission of data through external general-purpose input/output (GPIO) pins that connects the sensors. GPIO pins are just one example of how information can be communicated between sensors and, depending on the implementation, other approaches may be utilized.

As illustrated in FIG. 5(a), the sensors 522, 532 are connected using a pin 565, the sensors 512, 522 are connected using a pin 555, and sensors 502, 512 are connected using a pin 545. In an example configuration in which the sensor 532 is configured to transmit its data to the host processor 554 first, the switches 510, 520, 530 can all be set to bypass mode to allow the sensor 532 to transmit its data to the host processor 554. Once the sensor 532 has completed transmitting its data, the sensor 532 can instruct the sensor 522 to begin transmitting its data through the pin 565. Upon receiving the instruction from the sensor 532, the switch 530 can be positioned in normal mode and the sensor 522 can begin transmitting its data to the host processor 554. Once the sensor 522 has completed transmitting its data, the sensor 522 can instruct the sensor 512 to begin transmitting its data through the pin 555. Upon receiving the instruction from the sensor 522, the switch 520 can be positioned in normal mode and the sensor 512 can begin transmitting its data to the host processor 554. Finally, once the sensor 512 has completed transmitting its data, the sensor 512 can instruct the sensor 502 to begin transmitting its data through the pin 545. Upon receiving the instruction from the sensor 512, the switch 510 can be positioned in normal mode and the sensor 502 can begin transmitting its data to the host processor 554.

Figure 5B:
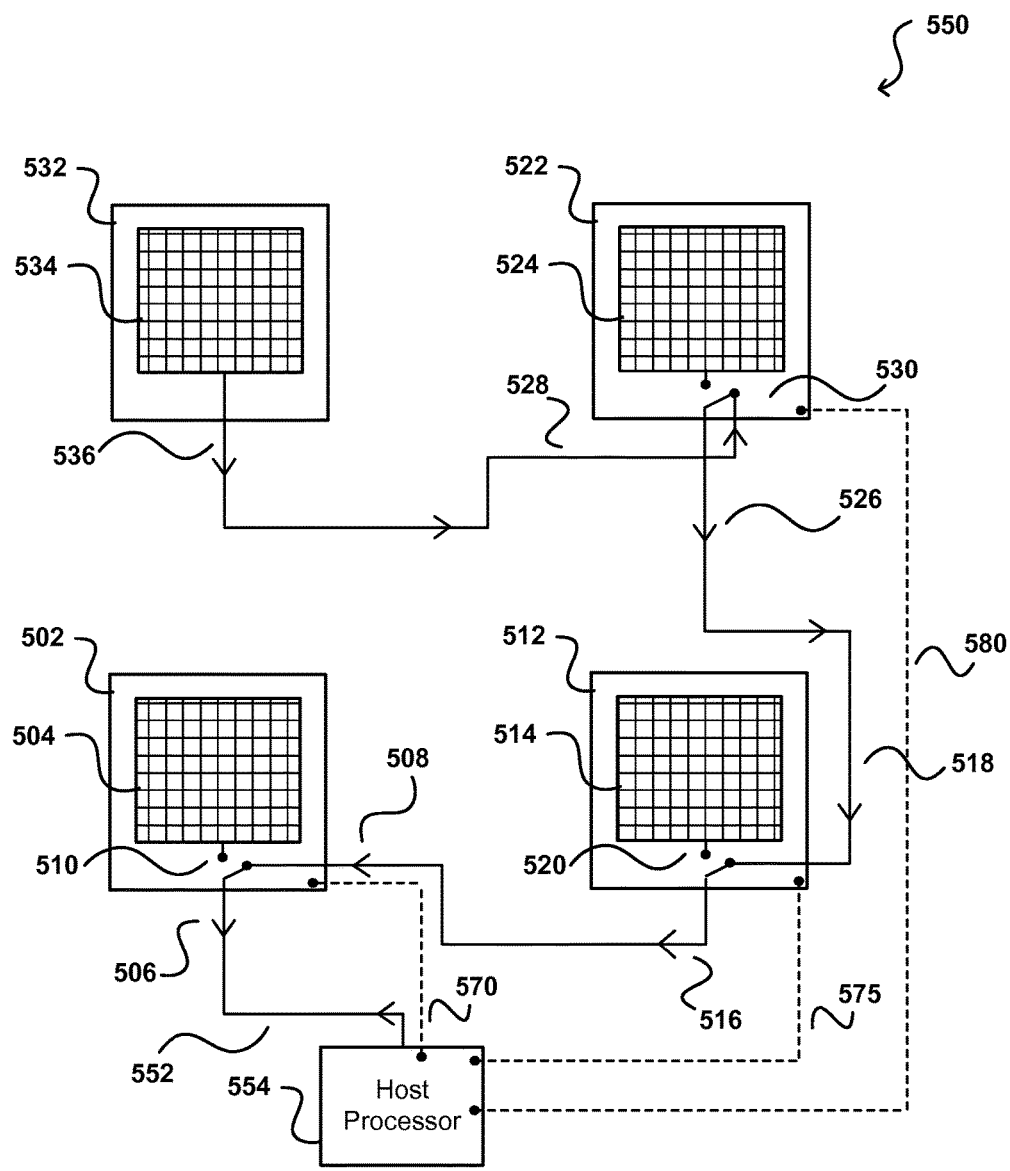

FIG. 5(b) illustrates a different daisy-chain configuration 550 for multiple sensors 502, 512, 522, 532 that can be used in accordance with various embodiments. Each sensor 502, 512, 522, 532 contains an active region 504, 514, 524, 534, respectively, for capturing data, e.g., light, and the sensors can each provide a signal including data representative of the captured data.

In this example configuration, the MIPI transmit line 536 from the sensor 532 is connected to the sensor 522 using a MIPI receive line 528 or other input to the sensor 522. The connection between the sensors 522, 532 can be accomplished using a multiplexer (MUX) positioned in the sensor 522. An electronic switch 530 is positioned at the location of the connection, and can alternatively connect the MIPI transmit 526, 536 of either of the sensors 522, 532, respectively, to the MIPI receive line 518 of the sensor 512.

Additionally, the MIPI transmit line 526 from the sensor 522 is connected to the sensor 512 using a MIPI receive line 518 or other input to the sensor 512. The connection between the sensors 512, 522 can be accomplished using a multiplexer (MUX) positioned in the sensor 512. An electronic switch 520 is positioned at the location of the connection, and can alternatively connect the MIPI transmit 516, 526 of either of the sensors 512, 522, respectively, to the MIPI receive line 508 of the sensor 502.

Further, the MIPI transmit line 516 from the sensor 512 is connected to the sensor 502 using a MIPI receive line 508 or other input to the sensor 502. The connection between the sensors 502, 512 can be accomplished using a multiplexer (MUX) positioned in the sensor 502. An electronic switch 510 is positioned at the location of the connection, and can alternatively connect the MIPI transmit 506, 516 of either of the sensors 502, 512, respectively, to the MIPI receive line 552 of the host processor 554.

The electronic switches 510, 520, 530 can be toggled between normal mode and bypass mode, as described above, to allow each of the sensors 502, 512, 522, 532 to transmit data in turn. To coordinate the transmission of data by the sensors 502, 512, 522, 532, in some embodiments, the sensors 502, 512, 522, 532 are able to coordinate the transmission of data based on instructions received from the host processor 554 indicating to a sensor when to transmit its data. In some embodiments, each of the master sensors 502, 512, and 522 is connected to the host processor 554 using respective pins 570, 575, and 580. The host processor 554 can coordinate the transmission of data from the sensors by instructing master sensors to toggle between normal mode and bypass mode through the pins 570, 575, and 580.

For example, in a configuration in which the sensor 532 is transmitting its data to the host processor 554 first, the switches 510, 520, and 530 can be positioned in bypass mode and the sensor 532 can transmit its data. Once the host processor 554 determines that the sensor 532 has completed transmitting its data, the host processor 554 positions the switch 530 to operate in normal mode so that the sensor 522 can begin transmitting its data. In some embodiments, the host processor 554 can send instructions for changing the positions of the switch 530 through an external general-purpose input/output (GPIO) pin 580 that connects the sensor 522 and the host processor 554. GPIO pins are just one example of how information can be communicated between sensors and, depending on the implementation, other approaches may be utilized. Next, once the host processor 554 determines that the sensor 522 has completed transmitting its data, the host processor 554 positions the switch 520 to operate in normal mode so that the sensor 512 can begin transmitting its data. Further, once the host processor 554 determines that the sensor 512 has completed transmitting its data, the host processor 554 positions the switch 510 to operate in normal mode so that the sensor 502 can begin transmitting its data. When changing the position of a switch, the host processor 554 can send instructions directly to the switch to change between normal and bypass modes. Alternatively, the host processor 554 can send instructions to the sensor to change the mode of the switch and the sensor then changes the mode of the switch. The instructions can be sent, for example, through the pin connecting the host processor 554 and the sensor in which the switch is located.

Figure 6:
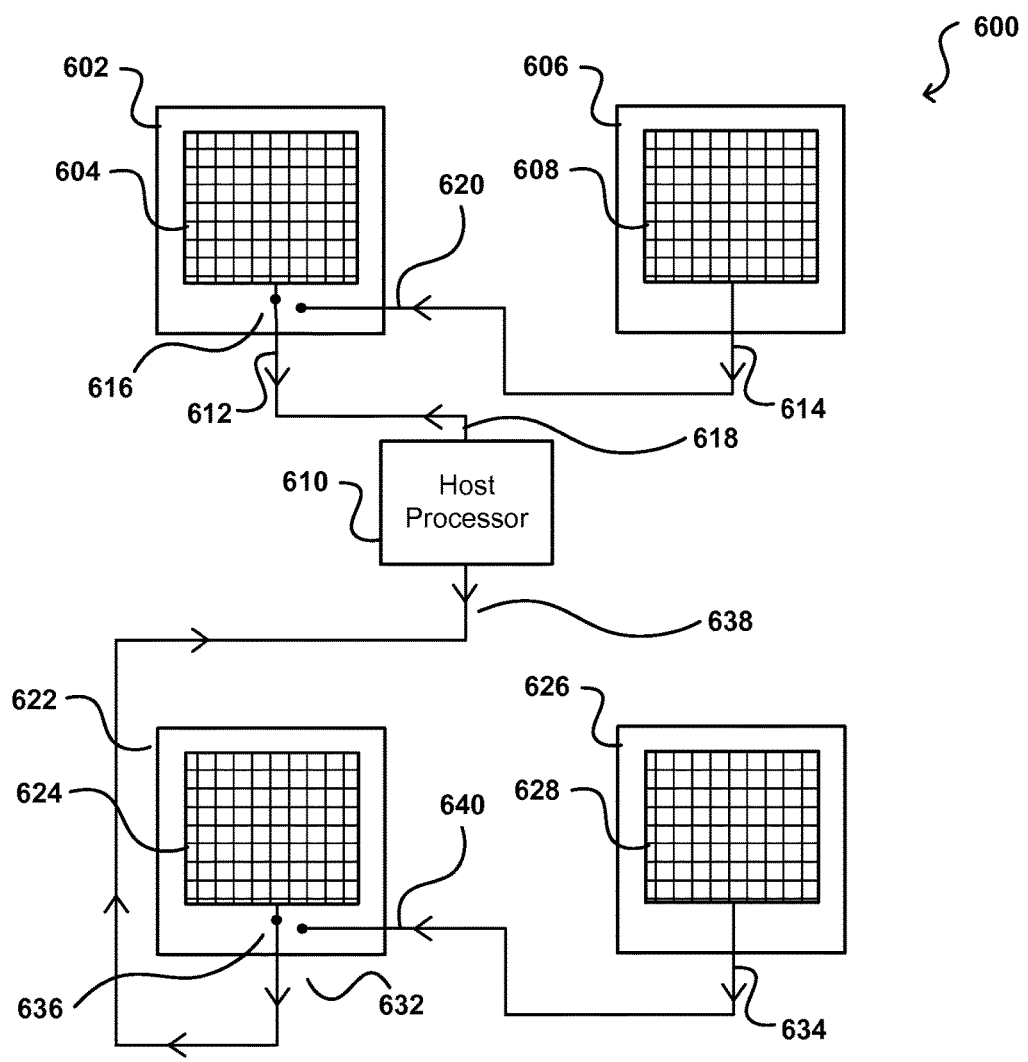
FIG. 6 illustrates a parallel configuration for multiple sensors that can be used in accordance with various embodiments.

FIG. 6 illustrates a parallel configuration 600 for multiple sensors 602, 606, 622, 626 that can be used in accordance with various embodiments. Each sensor 602, 606, 622, 626 contains an active region 604, 608, 624, 628, respectively, for capturing data, e.g., light, and the sensors can each provide a signal including data representative of the captured data.

In this example configuration, the MIPI transmit line 614 from the sensor 606 is connected to the sensor 602 using a MIPI receive line 620 or other input to the sensor 602. The connection between the sensors 602, 606 can be accomplished using a multiplexer (MUX) positioned in the sensor 602. An electronic switch 616 is positioned at the location of the connection, and can alternatively connect the MIPI transmit 612, 614 of either of the sensors 602, 606, respectively, to the MIPI receive line 618 of the host processor 610.

Similarly, the MIPI transmit line 634 from the sensor 626 is connected to the sensor 622 using a MIPI receive line 640 or other input to the sensor 622. The connection between the sensors 622, 626 can be accomplished using a multiplexer (MUX) positioned in the sensor 622. An electronic switch 636 is positioned at the location of the connection, and can alternatively connect the MIPI transmit 632, 634 of either of the sensors 622, 626, respectively, to the MIPI receive line 638 of the host processor 610.

The electronic switch 616 can be toggled between normal mode and bypass mode, as described above, to allow each of the sensors 602, 606 to transmit data in turn. Similarly, the electronic switch 636 can be toggled between normal mode and bypass mode, as described above, to allow each of the sensors 622, 626 to transmit data in turn. To coordinate the transmission of data by the sensors 602, 606, 622, 626, in some embodiments, the sensors 602, 606, 622, 626 are able to coordinate the transmission of data by indicating to one another when a sensor has completed transmission of its data. In some embodiments, the sensors can coordinate the transmission of data through external general-purpose input/output (GPIO) pins that connects the sensors, as described above. GPIO pins are just one example of how information can be communicated between sensors and, depending on the implementation, other approaches may be utilized.

For example, the sensor 602 can be configured to transmit first, followed by the sensor 606, then the sensor 622, and lastly the sensor 626. In this example configuration, the switches 616, 636 can be initially set to normal mode. When the sensors have data ready to be transmitted to the host processor 610, the sensor 602 can transmit its captured data to the host processor 610 first. Once the sensor 602 has completed transmitting its data, the sensor 602 can instruct the sensor 606 to begin transmitting its data, for example, through a pin connecting the two sensors. Upon receiving the instruction from the sensor 602, the switch 616 can be positioned in bypass mode and the sensor 606 can begin transmitting its data to the host processor 610. Once the sensor 606 has completed transmitting its data, the sensor 606 can instruct the sensor 622 to begin transmitting its data, for example, through a pin connecting the two sensors. Upon receiving the instruction from the sensor 606, the sensor 622 can begin transmitting its data to the host processor 610. Finally, once the sensor 622 has completed transmitting its data, the sensor 622 can instruct the sensor 626 to begin transmitting its data through, for example, through a pin connecting the two sensors. Upon receiving the instruction from the sensor 622, the switch 636 can be positioned in bypass mode and the sensor 626 can begin transmitting its data to the host processor 610.

In some embodiments, the sensors 602, 606, 622, 626 are able to coordinate the transmission of data by delaying the transmission of captured data until a specified amount of time has elapsed, as described above in reference to FIG. 4. Thus, a sensor can be configured to store its captured data for a specified amount of time to give the other sensor enough time to transmit its capture data to the host processor.

Figure 7:
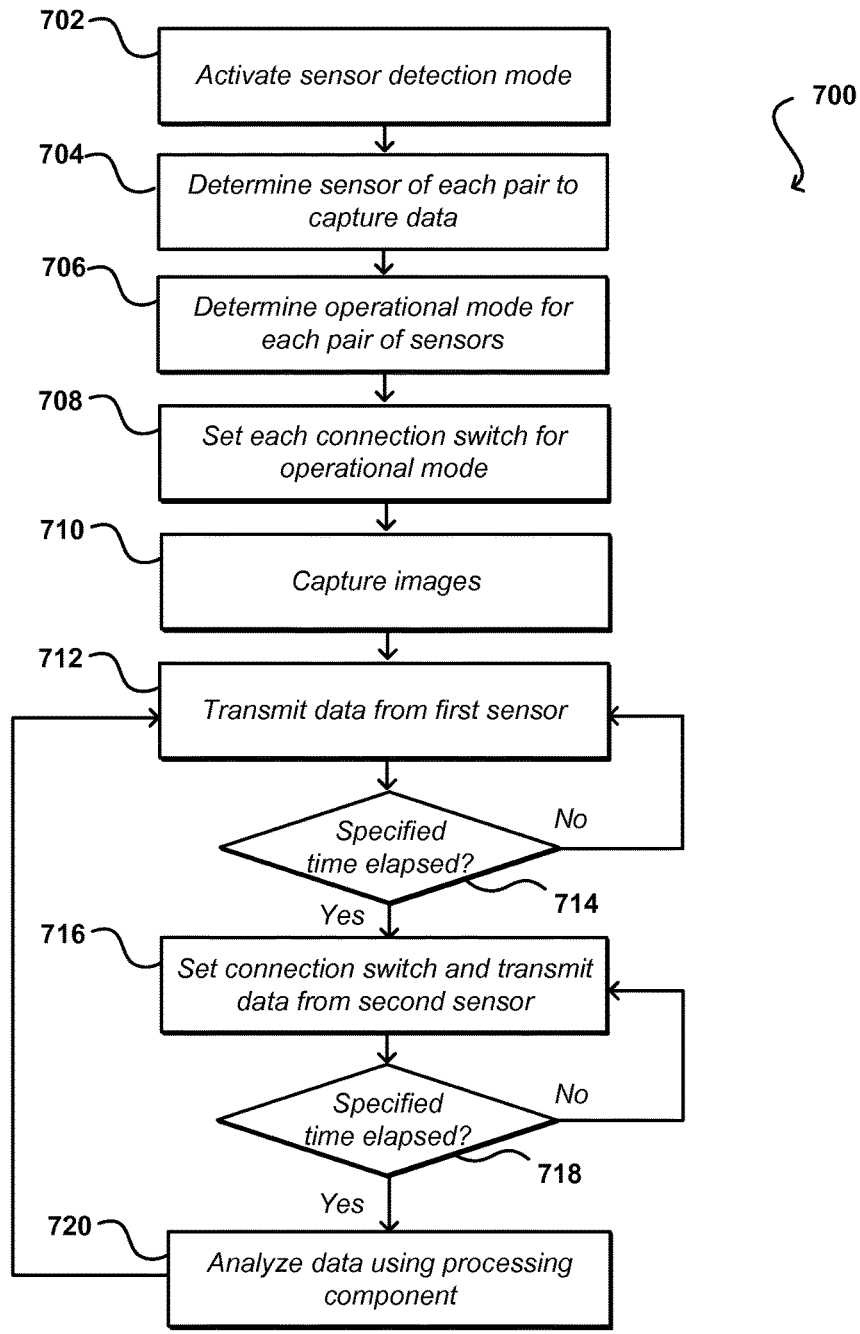
FIG. 7 illustrates an example process for using sensors in accordance with various embodiments.

FIG. 7 illustrates an example process 700 for enabling sensor input for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, sensor detection is activated 702 on the computing device. Selecting and using various sensors or imagers can be used with a number of different applications or purposes within the scope of the various embodiments, such as may include gesture detection, computer vision analysis, object recognition, object tracking, stereo imaging, three-dimensional imaging, depth sensing, augmented reality, and the like. In some embodiments, gesture detection (or other such functionality) can automatically be activated whenever the computing device is active, even in a sleep mode or other such low power state. In other embodiments, the gesture detection mode is activated automatically upon running an application or manually upon user selection. Various other activation events can be utilized as well.

The device can determine 704 the sensor of each pair to use for image capture, as may be based upon device orientation, relative user location, application, or other such information. As discussed, if there are more than two pairs of sensors on the device the device can also select which pairs to use for the image capture or gesture detection. The device (or a component in communication with the device) can also determine 706 the operational mode for each pair of sensors. As discussed, either of a pair of sensors can be used for image capture or gesture detection, for example, with the selection of the sensor causing that pair of sensors to operate in a normal or bypass mode. The connection switch (or other such mechanism) for each pair of sensors then can be set 708 for the determined operational mode, which can involve leaving the switch in its current state or adjusting the switch to transfer data from a different sensor to the respective processor.

One or more images can be captured 710 using a pair of selected sensors. The first sensor in the pair of sensors can begin transmitting its captured data to the respective processor 712. A determination is made whether a specified amount of delay has elapsed 714. If the amount of delay has not elapsed, then no change to the connection switch is made and the transmission from the first sensor continues to be received by the respective processor 712. If the amount of delay has elapsed, then the connection switch for the pair of sensors is set to transfer data from the second sensor and the second sensor begins transmitting its captured data to the respective processor 716.

Another determination is made whether a specified amount of delay has elapsed 718. If the amount of delay has not elapsed, then no change to the connection switch is made and the transmission from the second sensor continues to be received by the respective processor 716. If the amount of delay has elapsed, then the image data from each sensor can be transferred over the connection and analyzed 720 by the respective processor. Further, once the amount of delay has elapsed, the connection switch for the pair of sensors can be set to transfer data from the first sensor so that the first sensor can continue transmitting its captured data to the respective processor 712. For example, the first sensor can transmit image data that was captured while the second sensor was transmitting its captured data to the respective processor.

Figure 8:
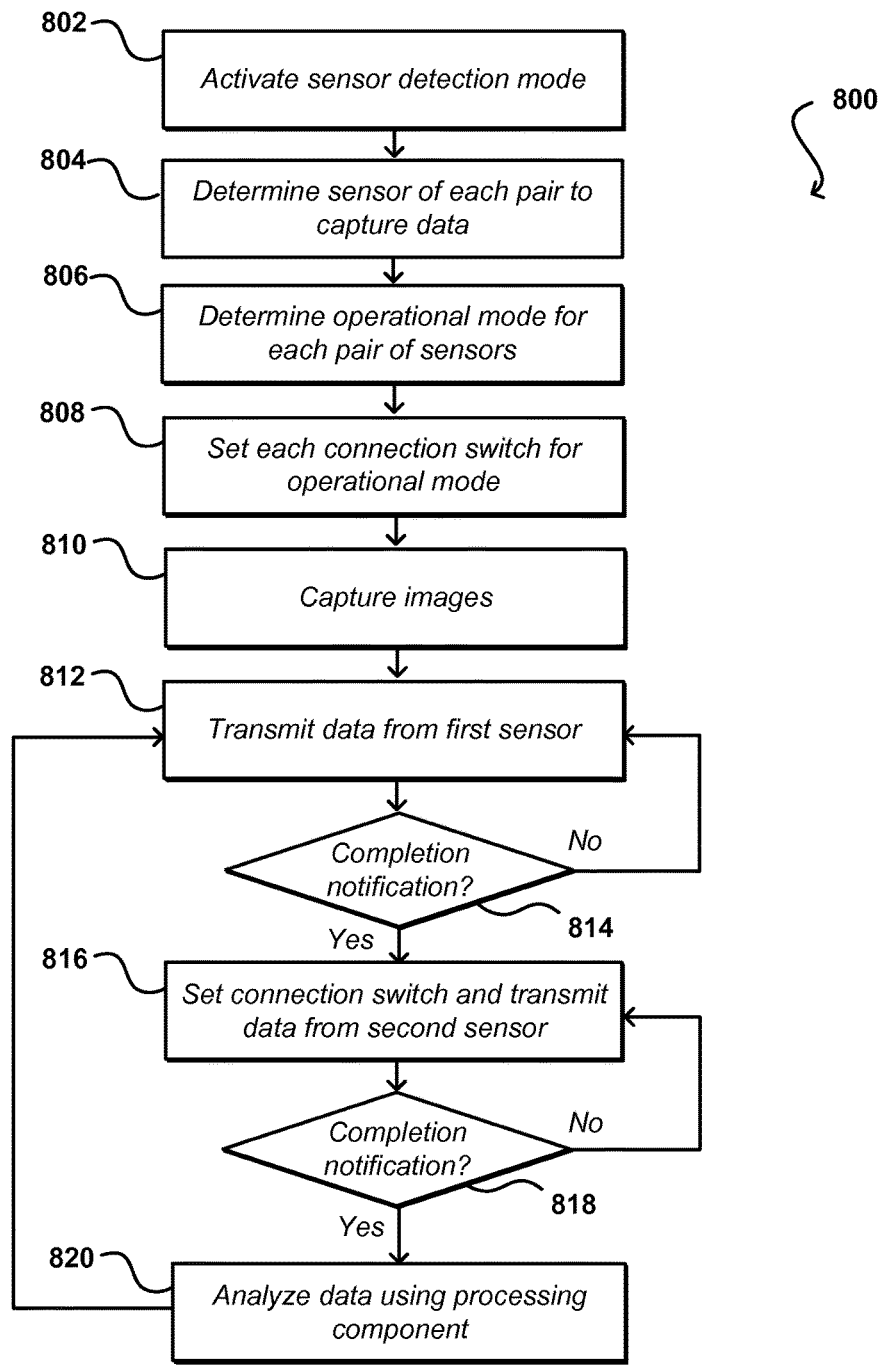
FIG. 8 illustrates an example process for using sensors in accordance with various embodiments.

FIG. 8 illustrates an example process 800 for enabling sensor input for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, sensor detection is activated 802 on the computing device. Selecting and using various sensors or imagers can be used with a number of different applications or purposes within the scope of the various embodiments, such as may include gesture detection, computer vision analysis, object recognition, object tracking, stereo imaging, three-dimensional imaging, depth sensing, augmented reality, and the like. In some embodiments, gesture detection (or other such functionality) can automatically be activated whenever the computing device is active, even in a sleep mode or other such low power state. In other embodiments, the gesture detection mode is activated automatically upon running an application or manually upon user selection. Various other activation events can be utilized as well.

The device can determine 804 the sensor of each pair to use for image capture, as may be based upon device orientation, relative user location, application, or other such information. As discussed, if there are more than two pairs of sensors on the device the device can also select which pairs to use for the image capture or gesture detection. The device (or a component in communication with the device) can also determine 806 the operational mode for each pair of sensors. As discussed, either of a pair of sensors can be used for image capture or gesture detection, for example, with the selection of the sensor causing that pair of sensors to operate in a normal or bypass mode. The connection switch (or other such mechanism) for each pair of sensors then can be set 808 for the determined operational mode, which can involve leaving the switch in its current state or adjusting the switch to transfer data from a different sensor to the respective processor.

One or more images can be captured 810 using a pair of selected sensors. The first sensor in the pair of sensors can begin transmitting its captured data to the respective processor 812. A determination is made whether a notification, or instruction, was received from the first sensor indicating that the first sensor has completed its transmission to the respective processor 814. If no notification was received, then no change to the connection switch is made and the transmission from the first sensor continues to be received by the respective processor 812. If a notification was received, then the connection switch for the pair of sensors is set to transfer data from the second sensor and the second sensor begins transmitting its captured data to the respective processor 816.

A determination is made whether a notification, or instruction, was received from the second sensor indicating that the second sensor has completed its transmission to the respective processor 818. If no notification was received, then no change to the connection switch is made and the transmission from the second sensor continues to be received by the respective processor 816. If a notification was received, then the image data from each sensor can be transferred over the connection and analyzed 820 by the respective processor. Further, once the notification is received, the connection switch for the pair of sensors can be set to transfer data from the first sensor so that the first sensor can continue transmitting its captured data to the respective processor 812. For example, the first sensor can transmit image data that was captured while the second sensor was transmitting its captured data to the respective processor.

Figure 9:
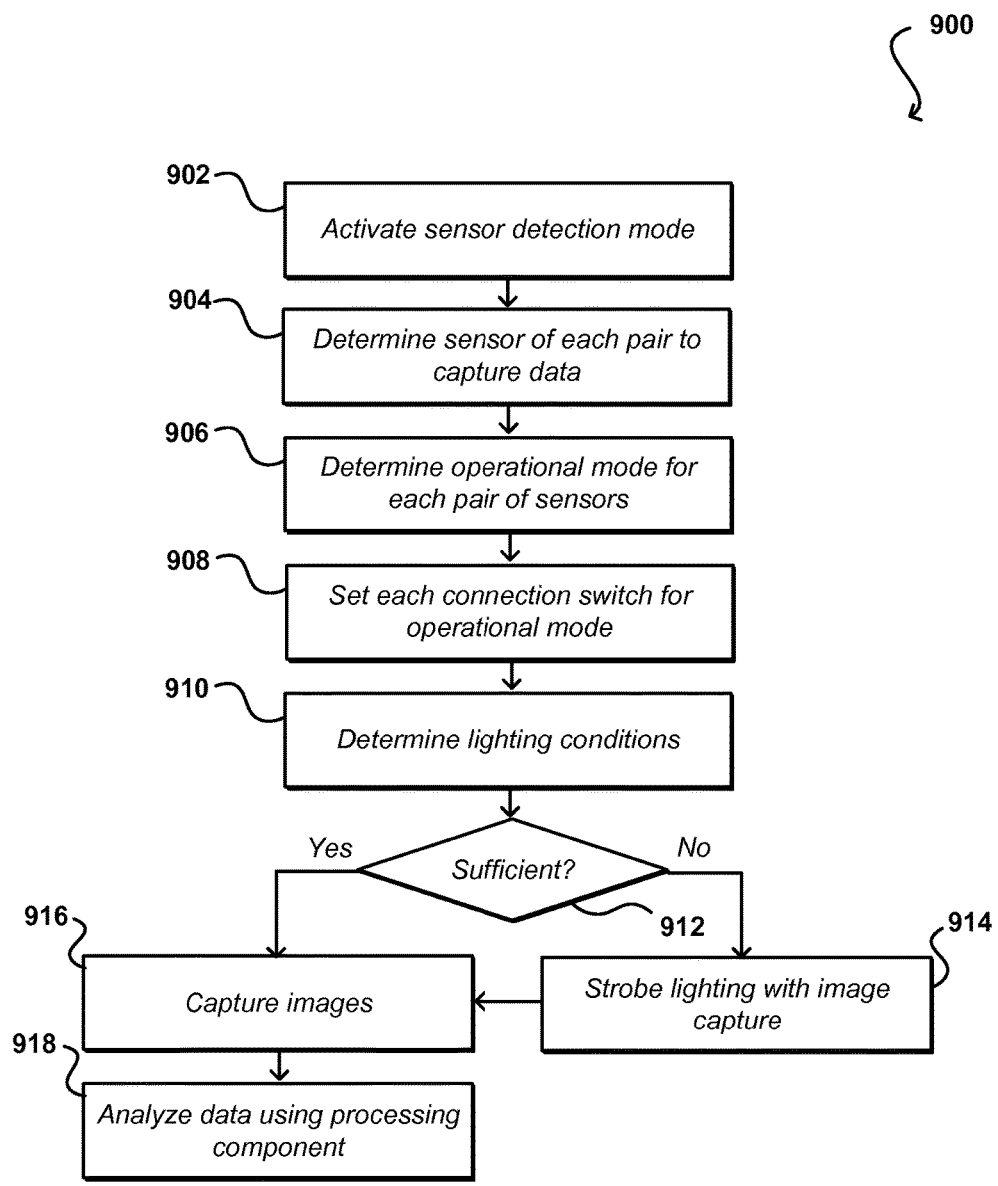
FIG. 9 illustrates an example process for using sensors for functions such as gesture input that can be used in accordance with various embodiments.

FIG. 9 illustrates an example process 900 for enabling sensor input for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, sensor detection is activated 902 on the computing device. Selecting and using various sensors or imagers can be used with a number of different applications or purposes within the scope of the various embodiments, such as may include gesture detection, computer vision analysis, object recognition, object tracking, stereo imaging, three-dimensional imaging, depth sensing, augmented reality, and the like. In some embodiments, gesture detection (or other such functionality) can automatically be activated whenever the computing device is active, even in a sleep mode or other such low power state. In other embodiments, the gesture detection mode is activated automatically upon running an application or manually upon user selection. Various other activation events can be utilized as well. The device can determine 904 the sensor of each pair to use for image capture, as may be based upon device orientation, relative user location, application, or other such information. As discussed, if there are more than two pairs of sensors on the device the device can also select which pairs to use for the gesture detection. The device (or a component in communication with the device) can also determine 906 the operational mode for each pair of sensors. As discussed, either of a pair of sensors can be used for image capture or gesture detection, for example, with the selection of the sensor causing that pair of sensors to operate in a normal or bypass mode. The connection switch (or other such mechanism) for each pair of sensors then can be set 908 for the determined operational mode, which can involve leaving the switch in its current state or adjusting the switch to transfer data from a different sensor to the respective processor.

In at least some embodiments, the device will attempt to determine 910 an amount of ambient lighting, such as by using at least one light sensor or analyzing the intensity of the light information captured by the sensors. The selection of sensors can affect the determination of necessary lighting in at least some embodiments. If the amount of ambient light (or light from an LCD screen, etc.) is determined 912 to be insufficient, or additional illumination is otherwise desired, at least one illumination element (e.g., an LED) can be triggered to strobe 914 at times and with periods that substantially correspond with the capture times and windows of the gesture sensors. The commands to the illumination element in at least some embodiments are sent over an I²C bus. If an illumination element is triggered or the ambient light is determined to be sufficient, one or more images can be captured 916 using the selected gesture sensors. The image data from each sensor can be transferred over the connection and analyzed 918 by the respective processor. If a function such as gesture detection is active, a determination can be made as to whether any detected motion corresponds to a recognizable gesture. If not, the device can continue to capture images and monitor for gestures. If the motion does correspond to a gesture, an action or input corresponding to that gesture can be determined and an action performed accordingly. Various other approaches can be used as well as discussed or suggested elsewhere herein.

Figure 10:
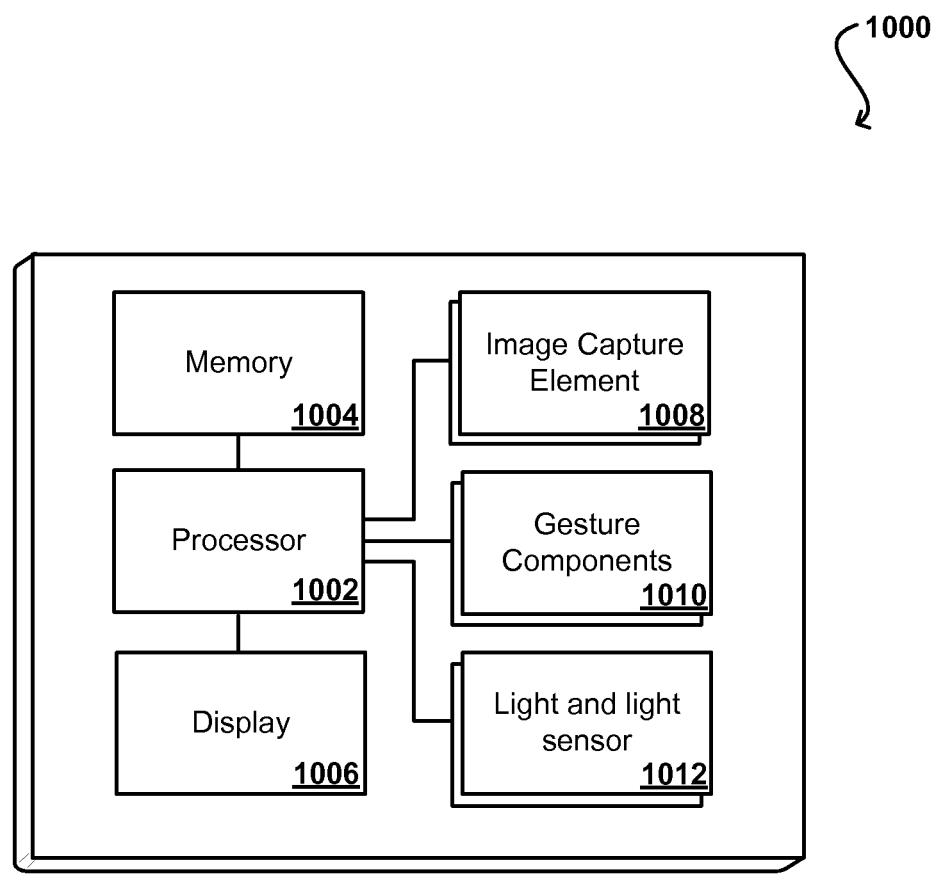
FIG. 10 illustrates an example configuration of components of a computing device that can be used in accordance with various embodiments.

In order to provide various functionality described herein, FIG. 10 illustrates an example set of basic components of a computing device 1000, such as the device 104 described with respect to FIG. 1. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instructions for execution by the processor 1002, the same or separate storage can be used for images or data, a removable storage memory can be available for sharing information with other devices, etc. The device typically will include some type of display element 1006, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include multiple image capture elements 1008, such as one or more high resolution cameras that are able to image a user, people, or objects in the vicinity of the device. The device can also include at least one separate gesture sensor 1010 operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. While the example computing device in FIG. 1 includes one image capture element and two gesture sensors on the "front" of the device, it should be understood that such elements could also, or alternatively, be placed on the sides, back, or corners of the device, and that there can be any appropriate number of capture elements of similar or different types for any number of purposes in the various embodiments. The device also can include at least one lighting element 1012, as may include one or more illumination elements (e.g., LEDs or flashlamps) for providing illumination and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Various embodiments also can control the shutter speed for various conditions. In some embodiments, a gesture sensor might have only have one effective "shutter" speed, such as may be on the order of about one millisecond in order to effectively freeze the motion in the frame. In at least some embodiments, however, the device might be able to throttle or otherwise adjust the shutter speed, such as to provide a range of exposures under various ambient light conditions. In one example, the effective shutter speed might be adjusted to 0.1 milliseconds in bright daylight to enable to the sensor to capture a quality image. As the amount of light decreases, such as when the device is taken inside, the shutter might be adjusted to around a millisecond or more. There might be a limit on the shutter speed to prevent defects in the images, such as blur due to prolonged exposure. If the shutter cannot be further extended, illumination or other approaches can be used as appropriate. In some embodiments, an auto-exposure loop can run local to the camera chip, and can adjust the shutter speed and/or trigger an LED or other such element as necessary. In cases where an LED, flashlamp, or other such element is fired to separate the foreground from the background, the shutter speed can be reduced accordingly. If there are multiple LEDs, such as one for a camera and one for a gesture sensor, each can be triggered separately as appropriate.

Figure 11:
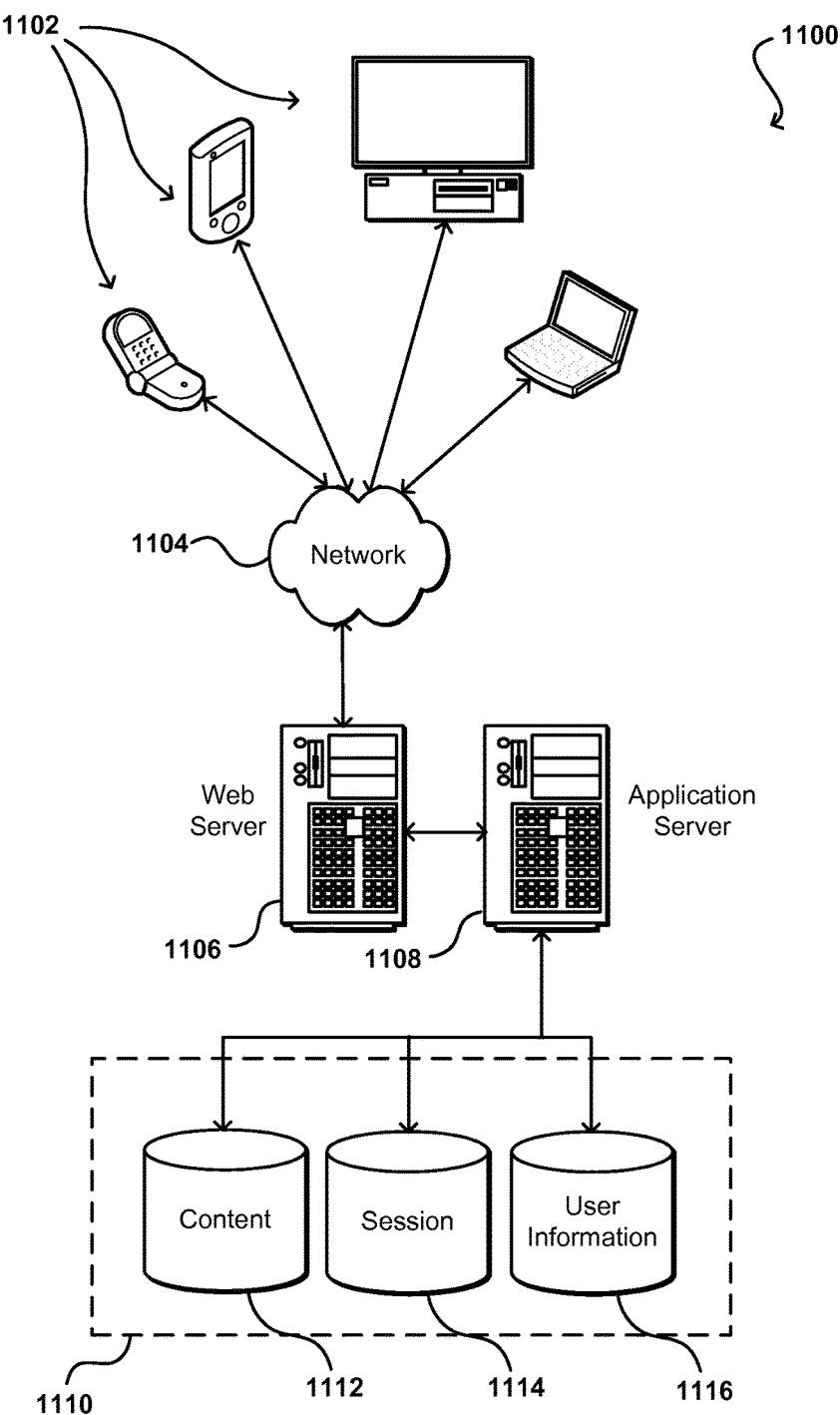
FIG. 11 illustrates an example environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a host processor;
   a first image sensor;
   a second image sensor including a first switch that, in a first state, connects the second image sensor to and disconnects the first image sensor from the host processor and that, in a second state, connects the first image sensor to and disconnects the second image sensor from the host processor, and first memory including first instructions that cause the second image sensor to:
   transmit first image data, captured by the second image sensor, to the host processor via the first switch in the first state;
   determine that a first amount of time has elapsed, the first amount of time corresponding to an amount of time that the first image sensor is configured to delay transmission of second image data captured by the first image sensor; and
   toggle the first switch from the first state to the second state to enable the first image sensor to transmit the second image data to the host processor via the first switch,
   wherein the second image sensor toggles the first switch without intervention from the host processor.

2. The computing device of claim 1, wherein the first switch is a multiplexer.

3. The computing device of claim 1, further comprising:
   a third image sensor; and
   a fourth image sensor including a second switch that, in a third state, connects the fourth image sensor to and disconnects the third image sensor from the first image sensor and that, in a fourth state, connects the third image sensor to and disconnects the fourth image sensor from the first image sensor, and second memory including second instructions that cause the fourth image sensor to:
   transmit third image data, captured by the fourth image sensor, to the first image sensor via the second switch in the third state;
   determine that a second amount of time has elapsed, the second amount of time corresponding to an amount of time that the third image sensor is configured to delay transmission of fourth image data captured by the third image sensor; and
   toggle the second switch from the third state to the fourth state to enable the third image sensor to transmit the fourth image data to the first image sensor via the second switch,
   wherein the fourth image sensor toggles the second switch without intervention from the host processor.

4. A computing device, comprising:
   a host processor;
   a first sensor;
   a second sensor including a first switch that, in a first state, connects the second sensor to the host processor and that, in a second state, connects the first sensor to the host processor, and first memory including first instructions that cause the second sensor to:
   transmit first data, captured by the second sensor, to the host processor via the first switch in the first state; and
   based on a determination that a first amount of time has elapsed, toggle the first switch from the first state to the second state to enable the first sensor to transmit second data, captured by the first sensor, to the host processor via the first switch,
   wherein the second sensor toggles the first switch without intervention from the host processor.

5. The computing device of claim 4, wherein the first instructions further cause the second sensor to:
   based on a determination that a second amount of time has elapsed, toggle the first switch from the second state to the first state;
   transmit third data, captured by the second sensor, to the host processor via the first switch; and
   based on a determination that the first amount of time has elapsed for a subsequent time, toggle the first switch from the first state to the second state to enable the first sensor to transmit fourth data, captured by the first sensor, to the host processor via the first switch.

6. The computing device of claim 4, further comprising:
a communication channel between the first sensor and the second sensor, wherein the communication channel conforms to a Mobile Industry Processor Interface (MIPI) standard.

7. The computing device of claim 4, further comprising:
a communication channel between the second sensor and the processor, wherein the communication channel conforms to a Mobile Industry Processor Interface (MIPI) standard.

8. The computing device of claim 4, wherein the first switch is a multiplexer.

9. The computing device of claim 4, wherein the first instructions further cause the second sensor to:
toggle the first switch from the first state to the second state each time the first amount of time has elapsed; and
toggle the first switch from the second state to the first state each time a second amount of time has elapsed.

10. The computing device of claim 4, further comprising:
a third sensor; and
a fourth sensor including a second switch that, in a third state, connects the fourth sensor to the first sensor and that, in a fourth state, connects the third sensor to the first sensor, and second memory including second instructions that cause the fourth sensor to:
transmit third data, captured by the fourth sensor, to the first sensor via the second switch in the third state; and
based on a determination that a second amount of time has elapsed, toggle the second switch from the third state to the fourth state to enable the third sensor to transmit fourth data, captured by the third sensor, to the first sensor via the second switch,
wherein the fourth sensor toggles the second switch without intervention by the host processor.

11. The computing device of claim 4, wherein the first amount of time is determined based at least in part on an amount of time for the second sensor to transmit the first data to the host processor.

12. The computing device of claim 4, wherein the first sensor is configured to store the second data for the first amount of time.

13. The computing device of claim 4, wherein the second sensor is configured to operate in one of a plurality of operational modes while the first sensor is connected to the host processor, and wherein the plurality of operational modes include at least one of a capture mode or a standby mode.

14. A computer-implemented method, comprising:
capturing first data using a first sensor of a computing device that includes a host processor, the first sensor, and a second sensor, the first sensor including a first switch that, in a first state connects the first sensor to the host processor and that, in a second state, connects the second sensor to the host processor;
transmitting the first data from the first sensor to the host processor via the first switch in the first state; and
based on a determination that the first sensor has completed transmission of the first data to the host processor, toggling the first switch from the first state to the second state to enable the second sensor to transmit second data, captured by the second sensor, to the host processor via the first switch,
wherein the first sensor toggles the first switch without intervention from the host processor.

15. The computer-implemented method of claim 14, further comprising:
based on a determination that the second sensor has completed transmission of the second data to the host processor, toggling the first switch from the second state to the first state;
transmit third data, captured by the first sensor, to the host processor via the first switch; and
based on a determination that the first sensor has completed transmission of the third data to the host processor, toggling the first switch from the first state to the second state to enable the second sensor to transmit fourth data, captured by the second sensor, to the host processor via the first switch.

16. The computer-implemented method of claim 14, wherein the second sensor is configured to store the second data until a time of the determination that the first sensor has completed transmission of the first data to the host processor.

17. The computer-implemented method of claim 14, wherein the determination that the first sensor has completed transmission of the first data to the host processor is based on a first general-purpose input/output (GPIO) communication between the first sensor and the second sensor.

18. The computer-implemented method of claim 17, wherein a determination that the second sensor has completed transmission of the second data is based on a second general-purpose input/output (GPIO) communication channel between the first sensor and the second sensor.

19. The computer-implemented method of claim 14, wherein a first control contact of the first sensor is connected to a second control contact of the second sensor, and wherein a first data transmission contact of the first sensor and a second data transmission contact of the second sensor are each connectable by the first switch to a data receiving contact the host processor.

20. The computer-implemented method of claim 14, wherein the first switch is a multiplexer.

* * * * *